United States Patent
Westcott et al.

[15] 3,678,742
[45] July 25, 1972

[54] TOLERANCE CHECKING SYSTEM

[72] Inventors: Vernon C. Westcott, Lincoln; Byron E. Blanchard, Lexington; Paul A. Davis, Cochituate; Stephane Prevot, Lexington, all of Mass.

[73] Assignee: Trans-Sonics, Inc., Lexington, Mass.

[22] Filed: Oct. 5, 1970

[21] Appl. No.: 77,864

[52] U.S. Cl. .......................................73/117.3, 116/129 R
[51] Int. Cl. .......................................................G01m 15/00
[58] Field of Search.................73/117.3, 116, 119, 178, 182, 73/509; 340/266, 271; 116/129, 129 R

[56] References Cited

UNITED STATES PATENTS 2,995,929  9/1971  Lindquist.............................73/117.3

Primary Examiner—Donald O. Woodiel
Attorney—Cesari and McKenna

[57] ABSTRACT

A tolerance checking system enables one to quickly verify whether or not a given primary parameter is within tolerance limits which are functions of one or more other secondary parameters. The system measures the values of the secondary parameters and uses these as inputs to function generators to generate corresponding upper and lower limit values of the primary parameter. The outputs of the function generators are connected to a meter by way of a three-position switch, with the upper limit output being applied to the meter when the switch is in its upper position and the lower limit output being fed to the meter in the lower switch position. Another sensor which measures the actual value of the primary parameter is connected to the meter when the switch is in its middle position.

In order to check whether the primary parameter is within the allowable limits, the operator sets the switch in the middle position so that the actual value of the primary parameter is shown in the meter. Then he flips the switch to the upper and lower positions. The directions of movement of the meter pointer when the switch is actuated indicate whether the primary parameter is within tolerance limits.

11 Claims, 3 Drawing Figures

EGT AND ENGINE SPEED SCHEDULE

TOLERANCE CHECKING SYSTEM

BACKGROUND OF THE INVENTION

1. Field of the Invention

This invention relates to a tolerance checking system. It relates more particularly to a system which enables one to verify that the value of a particular (primary) parameter of interest lies between upper and lower limit values which are functions of one or more other (secondary) parameters.

These systems have many applications. However, for illustrative purposes, the present invention will be described in terms of a system for checking whether the speed of a jet engine and its exhaust temperature are within allowable upper and lower limits.

Before attempting a takeoff with a jet engine, the pilot must make sure that the engine has sufficient thrust. The thrust depends on several parameters including engine speed. Therefore, in following one acceptable procedure, the pilot applies full throttle to the engine before takeoff and checks the resulting engine speed against a lower limit which is a function of air inlet temperature and exhaust temperature. If the speed is below this limit, which corresponds to minimum acceptable thrust, he cannot take off.

Another limitation is imposed by the temperature in the combustion chamber of the engine: if the temperature is too high, there will be structural failure. Because this temperature is so high, it is difficult to measure it directly. However, it is a function of engine speed, inlet temperature and exhaust temperature, all of which can be measured. Since combustion chamber temperature increases with engine speed, the upper limit on this temperature corresponds to an upper limit on engine speed. The latter limit, in turn, is also a function of the inlet and exhaust temperature.

Accordingly, during his pre-takeoff checkout, the pilot ascertains whether or not the engine speed at full throttle is between upper and lower limits imposed by the thrust and combustion chamber temperature constraints. He does this by using a chart 10 of the type illustrated in FIG. 3.

The chart 10 contains graphs 12 and 14 relating engine speed to the air inlet and exhaust temperatures, respectively. The graph 12 includes an upper limit curve 16 and a lower limit curve 18. Similarly the graph 14 includes upper and lower limit curves 20 and 22.

The pilot's instrument panel includes meters indicating engine speed, air inlet temperature and exhaust temperature. During checkout, he applies these readings to the chart 10 to make sure that these parameters fall within the limits recorded on the chart. For example, assume that the air inlet temperature is 10°C, the exhaust temperature is 680° and the engine speed at full throttle is 97 percent of rated speed. The intersection of coordinate lines for inlet temperature and engine speed is a point 24 between the upper and lower limit inlet temperature curves 16 and 18; also the intersection corresponding to exhaust temperature and engine speed is a point 26 between the limit curves 20 and 22. Accordingly, the engines pass this phase of the checkout procedure.

On the other hand, if the engine speed were 98 percent at the postulated 10°C inlet temperature, it would be outside the inlet temperature tolerance band defined by the curves 16 and 18 and the engine would not pass. The same result would be obtained if the exhaust temperature were 640°C at 97 percent engine speed.

2. Prior Art

It is quite apparent that this is a tedious and time-consuming process. Also, because the pilot is particularly busy with other matters just prior to takeoff, there is a very great chance of error as he plots the various input parameters on the chart to determine whether or not their points of intersection fall within the tolerance bands. He may even omit this procedure altogether.

Moreover, the tolerance bands on the chart 10 are drawn to take into account the fact that the meters used to indicate temperature and engine speed have built-in errors and, furthermore, cannot be read with a great deal of accuracy. Specifically, these bands may be narrowed by as much as 7 percent or more to take into account the possibility of instrument error. Consequently, some flights are aborted, even though the measured parameters are actually within acceptable limits, because there is no way of knowing that these conditions are really satisfactory.

SUMMARY OF THE INVENTION

Accordingly, we aim to provide an improved tolerance checking system for ascertaining limits which are functions of one or more other secondary parameters.

Another object of the invention is to provide a tolerance checking system which gives an easily discernible visual indication of whether or not a particular parameter is within tolerance limits established for it.

Another object of the invention is to provide a tolerance checking system which enables a pilot to determine whether he can obtain sufficient thrust during takeoff without overheating his engine.

Other objects will in part be obvious and will in part appear hereinafter.

Accordingly, the invention comprises the features of construction, combination of elements and arrangement of parts which will be exemplified in the construction hereinafter set forth and the scope of the invention will be indicated in the claims.

In general, the present tolerance checking system, as adapted to the jet engine application discussed above, comprises two separate tolerance checking sections, corresponding to the graphs 12 and 14 of FIG. 3. One section (hereinafter called the CIT section) helps the pilot ascertain whether the maximum engine speed is within limits corresponding to the compressor inlet temperature. The other section (hereinafter designated the EGT section) aids in determining whether exhaust gas temperature is within the tolerance band for the engine speed. The visual indications from these sections are given on a pair of meters.

The CIT section comprises the temperature sensor positioned at the compressor inlet. The output voltage from this sensor is applied to a pair of upper and lower limit function generators which develop output voltages corresponding to the engine speeds indicated by the upper and lower limit curves 16 and 18 of FIG. 3.

The outputs of the two function generators are applied alternatively to the pilot's engine speed meter by way of the upper and lower positions of a three-position switch. In its normal middle position, the switch couples the meter to the tachometer generator connected to the engine shaft.

Consequently, with the switch in its middle position the meter indicates actual engine speed. With the switch in its upper position, the meter indicates the upper limit of engine speed for the existing compressor, inlet temperature. Similarly, when the switch is in its lower position, the meter indicates the lower limit of engine speed.

This arrangement enables the pilot to verify very quickly and easily whether his engine speed is within the allowable tolerance limits for the prevailing inlet temperature without recourse to any charts or graphs. He simply starts with the switch in its middle position and observes the meter pointer. We will assume that the actual engine speed is 95.5 percent of the nominal maximum, so that the pointer indicates 95.5. Then he moves the switch to its upper position so that the indication on the meter now reflects the output of the upper limit function generator for the existing input temperature condition. Assume that the upper speed limit for the existing inlet temperature is 97 percent, i.e., a reading of 97 on the meter. As soon as the pilot actuates the switch, the meter pointer jumps from 95.5 to 97. The mere upward movement of the pointer in this fashion immediately tells the pilot that his actual engine speed is below the upper limit engine speed for the particular inlet temperature condition.

On the other hand, if the pointer moves downward when he actuates the switch, he knows that his engine speed is beyond the allowable tolerance limit and he shuts off the engine.

Following this upper limit check, the pilot returns the switch to its middle position so that the actual engine speed is again presented on the dial, and then he moves the switch to its lower position so that the output of the lower limit function generator appears on the meter. The mere downward movement of the pointer signals the pilot that his actual speed is above the lower limit. If, on the other hand, the pointer moves upward, the pilot knows that his actual speed is below the lower limit.

A comparable arrangement is provided in the EGT section to verify that the engine exhaust gas temperature is within the tolerance limits established for the existing engine speed. The output of the tachometer generator is applied to a pair of upper and lower limit function generators whose output voltages vary with engine speed in accordance with the upper and lower limits of the exhaust gas temperature as indicated by the curves 20 and 22 in FIG. 3. The outputs of these two generators are then fed alternatively to the pilot's exhaust temperature meter along with the output of the conventional temperature sensor installed in the engine's exhaust manifold.

By properly actuating an associated position switch as described above, the pilot can apply to the exhaust temperature meter his actual exhaust temperature, the temperature upper limit for the existing engine speed and the temperature lower limit for that speed. Thus, by manipulating the switch and merely observing the direction of movement of the meter pointer, he can immediately verify that his exhaust gas temperature is within the acceptable tolerance limits for the engine speed.

It is important to note that the pilot does not have to take any actual readings from the two meters in following this checkout procedure. He only has to observe the direction of movement of the meter pointers. Consequently, the entire check can be performed very quickly with a minimum of effort and with little chance of pilot error.

Furthermore, the present system eliminates the effect of meter error. For example, suppose that the meter moves upwardly when the associated switch is moved to change the meter input from the value of the observed parameter to the upper limit provided by one of the function generators. One can then assume that the actual value is within the upper limit regardless of error in the meter itself.

With these reductions in error, the tolerance bands can be widened, thereby permitting operation in safe circumstances which would previously have caused cancellation of the flight.

BRIEF DESCRIPTION OF THE DRAWINGS

For a fuller understanding of the nature and objects of the invention, reference should be made to the following detailed description taken in connection with the accompanying drawings, in which.

DESCRIPTION OF THE PREFERRED EMBODIMENT

Figure 1:
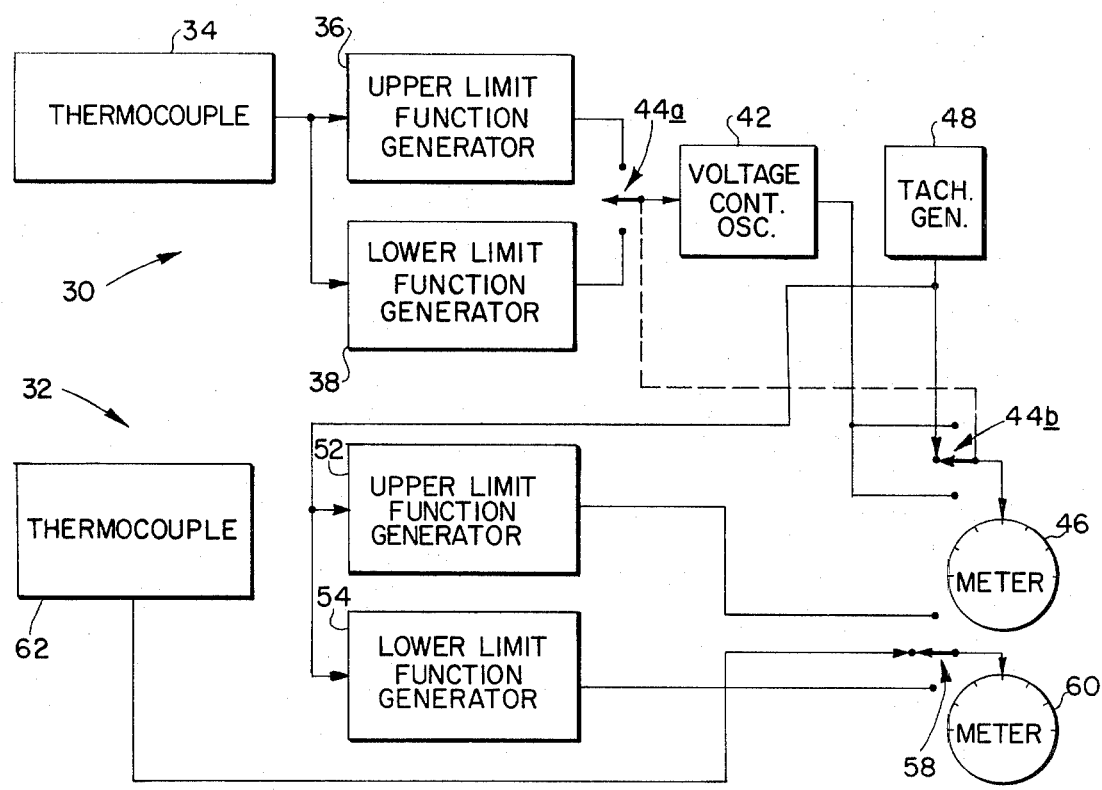
FIG. 1 is a block diagram of a tolerance checking system embodying the principles of the invention.
Figure 3:
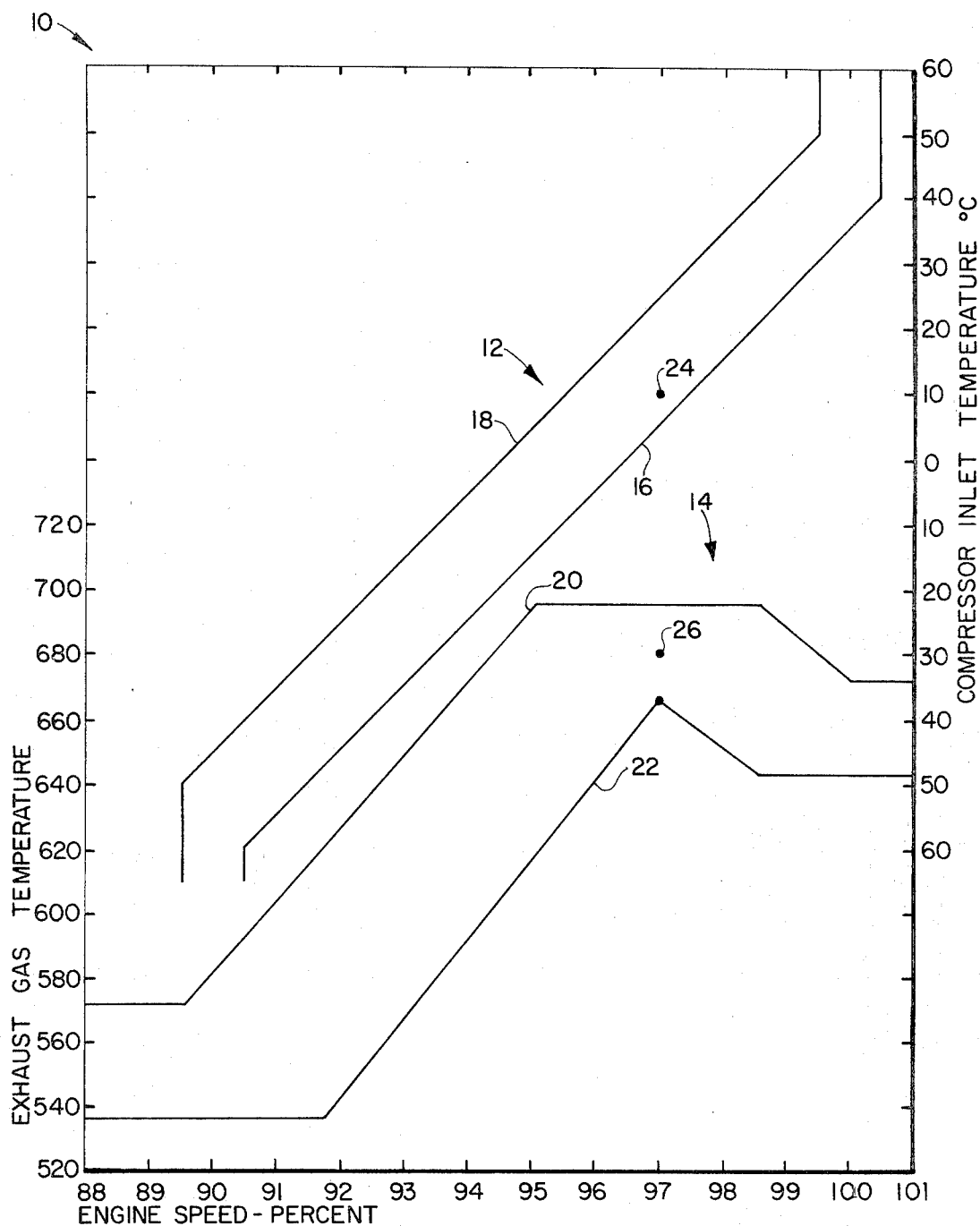
FIG. 3 graphically depicts the acceptable relationship between maximum engine speed and inlet and exhaust temperatures for a particular jet engine.

Referring now to FIG. 1 of the drawings, the tolerance checking system shown there completely replaces and eliminates the need for the chart shown in FIG. 3. The system comprises two sections, namely, a compressor inlet temperature section 30 and an exhaust temperature section 32. The operation of both of these sections is very similar.

The section 30 comprises a thermocouple 34 which is positioned to sense the compressor inlet temperature. The thermocouples are normally the only components installed by the engine maker so that the manufacturing and maintenance responsibilities for all parts of the present system are clear. The output of the thermocouple 34 is applied to an upper limit function generator 36 and a lower limit function generator 38. Generator 36 produces an output voltage which varies with the input voltage from thermocouple 34 in accordance with the upper limit curve 16 of graph 12 in FIG. 3. That is, if the temperature of the thermocouple 34 is made to vary over the inlet temperature range shown in chart 10, the generator 36 output varies in accordance with the corresponding engine speed limit depicted by the curve 16.

Similarly, the lower limit function generator 38 varies with the input voltage from the thermocouple in accordance with the lower limit curve 18 in the graph 12.

The outputs of the two generators 36 and 38 are applied to a voltage-controlled oscillator 42 by way of a three-position switch section indicated at 44a. When switch section 44a is in its upper position, it applies the output of generator 36 to oscillator 42; in its lower position, it applies the output of generator 38 to oscillator 42. The frequency of oscillator 42 is linearly related to the control voltage from the generator 36 or 38. When the switch section 44a is in its third or middle position, oscillator 42 receives no input from either of the generators.

The output of oscillator 42, in turn, is applied by way of a three-position switch section indicated at 44b to a frequency-responsive tachometer meter 46. When switch section 44b is in either its upper or lower position, the output of oscillator 42 is applied to the meter. On the other hand, when switch section 44b is in its third or middle position, it applies the output of a convention A.C. tachometer generator 48 to meter 46. The tachometer generator 48 develops an output whose frequency reflects the actual engine speed.

Switch sections 44a and 44b are part of the same switch structure and thus they operate in unison by means of a single handle on the pilot's control panel. Preferably, the handle is spring biased to its middle position, to which it automatically returns when released.

Thus, the output of the tachometer generator 48 is normally applied to meter 46 so that its pointer indicates the actual engine speed. However, by moving the switch 44 handle up or down, the dial indication will reflect instead the output of the upper limit function generator 36 or the lower limit function generator 38. In other words, with the switch 44 in its upper position, meter 46 will indicate the upper limit engine speed for the particular inlet temperature sensed by thermocouple 34. On the other hand, with the switch 44 in its lower position, the meter will show the lower limit engine speed for that particular temperature condition.

Figure 2:
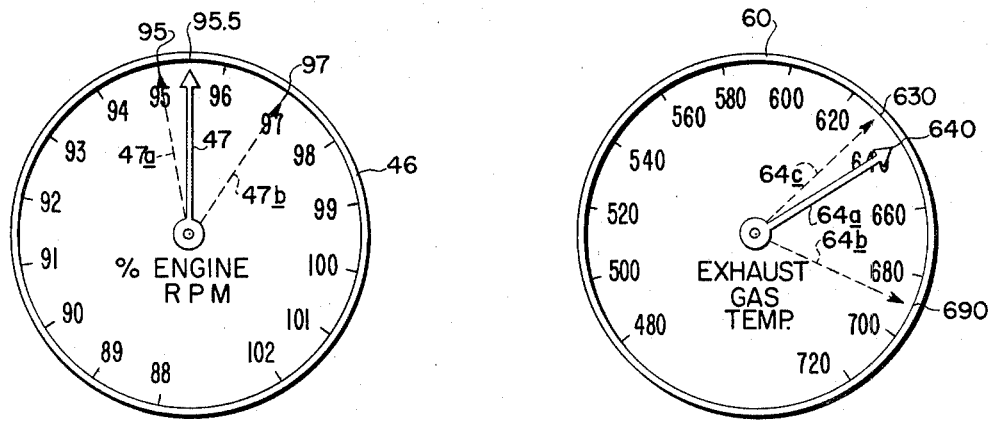
FIG. 2 is a view of the indicating meters used in the FIG. 1 system.

In practice, then, as part of his pre-flight routine, the pilot sets his engine for maximum thrust. He then moves switch 44 to its upper position so that oscillator 42 is controlled by the output of the upper limit function generator 36 and the oscillator output is applied to meter 46 in lieu of the tachometer generator output. With this input applied to the meter, the pointer immediately moves upward to the upper limit engine speed if the actual speed is below this limit. In this case, as shown in FIG. 2, the meter pointer 47 swings up on the meter scale to 97 (dotted arrow 47b). This upward movement of the pointer means that the actual engine speed is indeed below the upper limit speed. Otherwise, the pointer would not have moved up the scale.

Following this, the pilot releases the switch 44, which snaps back to its middle position so that the actual engine speed is again indicated on meter 46. Then, he moves the switch to its lower position, to present the lower limit speed for the particular input temperature condition on the meter. In this example, the lower limit speed happens to be 95, as shown on the meter scale. The pointer immediately moves down the scale (dotted arrow 47a), telling the pilot that his actual engine speed is above the lower limit speed.

Thus, with only two quick actuations of a single switch and a brief observation of the movements of a pointer, the pilot can readily ascertain that his engine speed satisfies the constraints imposed by the prevailing compressor inlet temperature.

The exhaust temperature section 32 is somewhat similar to inlet temperature section 30 and it is used by the pilot in exactly the same way to verify that the existing exhaust gas temperature is within limits established by the engine speed.

More particularly, the output of the tachometer generator 48 is applied to a pair of function generators 52 and 54. Generator 52 develops an output voltage which varies with the input frequency from generator 48 in accordance with the upper limit curve 20 in graph 14 (FIG. 3). Generator 54 on the other hand, produces an output voltage which varies in accordance with the tachometer output frequency as per the lower limit curve 22 in FIG. 3.

The outputs of the function generators 52 and 54 are applied by way of the upper and lower positions, respectively, of a three position switch 58 to a meter 60. The middle position of switch 58 converts the d.c. output of a thermocouple 62 to the meter 60. The thermocouple 62 is situated in the exhaust manifold of the engine and it responds to the actual temperature there.

By manipulating the switch 58 as described above in connection with switch 44, the pilot can ascertain whether or not his engine's exhaust gas temperature is within the limits established by the existing engine speed. That is, with the switch 58 in the middle position, actual exhaust gas temperature as indicated by the meter pointer 64 (solid line 64a in FIG. 2). Assume that the temperature is 640° in this example. The pilot moves the switch 58 up and observes the direction of movement of the pointer. In this case, the pointer moves up to 690° (dotted arrow 64b), so that the pilot knows his actual exhaust temperature is below the upper limit.

Then he returns the switch to the middle position and then moves it down again, observing the direction of pointer movement once more. In this example, the pointer swings down to 630° (arrow 64c) so that the pilot can see immediately that the exhaust temperature exceeds the lower limit.

Thus, with only two quick actuations of a single switch and a brief observation of the movements of a pointer, the pilot can readily ascertain that his engine speed satisfies the constraints imposed by the prevailing compressor inlet temperature.

Moreover, he need not take into account the possibility of meter errors because any such errors affect all such readings equally. Therefore, they do not influence appreciably the directions of movement of the pointers upon which this tolerance check is based.

It will be apparent, therefore, that a pilot, through the quick manipulation of two switches on his instrument panel, can accomplish what he formerly had to do by tediously plotting on a hand-held chart.

While the invention has been described specifically in connection with parameters of interest in the operation of a jet engine, its applicability extends far beyond this single operational environment. It can be used in all kinds of situations where one wishes to determine whether a primary parameter is within limits that are functions of one or more secondary parameters. These applications will be encountered in the laboratory as well as in the "field."

It will thus be seen that the objects set forth above, among those made apparent from the preceding description, are efficiently attained, and since certain changes may be made in the above construction without departing from the scope of the invention, it is intended that all matter contained in the above description and shown in the accompanying drawings shall be interpreted as illustrative and not in a limiting sense.

It will also be understood that the following claims are intended to cover all of the generic and specific features of the invention described herein.

I claim:

1. A tolerance checking system comprising
    A. a first sensor for sensing a first variable parameter,
    B. a function generator responsive to the output of the sensor for generating a limitation value of a second variable parameter in terms of said first variable parameter,
    C. a second sensor for sensing the actual value of the second parameter,
    D. an indicator responsive to the outputs of the function generator and the second sensor, and
    E. means for applying the outputs of the function generator and second sensor alternatively to the indicator so that the actual second parameter value can be compared with the limitation on the second parameter by observing the change in the indication of the indicator when the inputs of the indicator are alternated.

2. A tolerance checking system as defined in claim 1
    A. wherein the indicator comprises a meter having a pointer and a scale, and
    B. the comparison is made by observing the direction of movement of the meter pointer on the scale.

3. A tolerance checking system in accordance with claim 1,
    A. further including means
        1. in circuit between the function generator and the indicating means, and
        2. responsive to the output of the function generator for producing a signal whose frequency varies with changes in the output of the sensor,
    B. in which the second sensor generates an output frequency which varies in accordance with changes in the second parameter value, and
    C. the indicator is a frequency responsive meter, whose indication varies in accordance with the frequency applied to the meter.

4. A tolerance checking system as defined in claim 1 wherein the first sensor is a temperature sensor positioned at a selected location in a jet engine and the second parameter is the speed of the engine.

5. A tolerance checking system for determining whether the speed of a jet engine at maximum thrust is within limits imposed by temperature conditions, said system comprising
    A. a temperature sensor situated at a selected critical temperature zone of the jet engine, said sensor providing a temperature-indicating electrical signal,
    B. a first function generator for relating said temperature indicating signal to an upper limit engine speed,
    C. a second function generator for relating said temperature indicating signal to a lower limit engine speed,
    D. a tachometer including a tachometer generator and a meter which indicates the actual speed of the engine, and
    E. means for selectively switching the outputs of the function generators and the tachometer generators to the meter so that the operator can verify that his actual speed is within the upper and lower limits for the existant temperature conditions by observing the direction of movement of the meter pointer when the switching means is actuated.

6. Apparatus for checking whether or not a primary parameter is within tolerance limits which are functions of one or more secondary parameters, said apparatus comprising
    A. means for sensing the values of the secondary parameters, each of said sensing means developing an output corresponding to the value sensed by it,
    B. means responsive to the outputs of the sensing means for generating corresponding upper and lower limit values of the primary parameter,
    C. a detector for determining the actual value of the primary parameter,
    D. an indicator responsive to the outputs of the generating means and the detector,
    E. means for switching the outputs of the generating means and the detector selectively to the indicator so that an operator can verify that the actual value of the primary parameter is within allowable tolerance limits for the prevailing secondary parameter conditions by observing the changes in indication of the indicator during switching.

7. Apparatus as defined in claim 6 wherein a secondary parameter is jet engine compressor inlet temperature and the primary parameter is engine speed.

8. Apparatus as defined in claim 7 wherein said indicator comprises a tachometer meter having a pointer and a scale and the check is performed by observing a direction of movement of the pointer on the scale during switching.

9. Apparatus as defined in claim 8 and further including frequency generating means in circuit between the generating means and the switching means for converting the output of the generating means to a signal frequency.

10. Apparatus as defined in claim 6 wherein a secondary parameter is jet engine speed and the primary parameter is engine exhaust gas temperature.

11. A tolerance checking system for verifying that jet engine speed and exhaust gas temperature prior to takeoff are within allowable tolerance limits considering also the prevailing engine inlet temperature so as to secure maximum engine thrust without overheating the engine combustion chamber, said system comprising A. a first temperature sensor at the engine inlet, said sensor producing an electrical output corresponding to the temperature at that location,
B. a first function generator responsive to the output of the first sensor, said generator producing an output signal corresponding to the engine speed upper limit for the temperature condition at the engine inlet,
C. a second function generator responsive to the output of the first temperature sensor for producing an output signal corresponding to the engine speed lower limit for the temperature condition at the engine inlet,
D. a tachometer generator for developing a signal reflecting actual engine speed,
E. a meter controlled by the output of the tachometer generator and the outputs of the function generators,
F. means for switching the outputs of the function generators and the tachometer generator selectively to the meter so that in different positions of the switching means, the meter indicates
  1. actual engine speed as measured by the tachometer generator,
  2. the engine speed upper limit for any given engine inlet temperature,
  3. the engine speed lower limit for the same input temperature condition, and
  4. an operator is thereby able to quickly verify that his actual engine speed is within the upper and lower speed limits by manipulating the switching means between its various positions and observing the direction of movement of the meter pointer,
G. a third function generator responsive to the output of the tachometer generator for producing an output signal corresponding to the exhaust gas temperature upper limit for the existing engine speed,
H. a fourth function generator responsive to the output of the tachometer generator for producing an output signal corresponding to the exhaust gas temperature lower limit for the existing engine speed,
I. a second temperature sensor at the engine outlet said sensor producing an electrical output corresponding to the temperature at that location,
J. a second meter controlled by the output of the second sensor and the outputs of the third and fourth function generators, and
K. second means for switching the outputs of the third and fourth function generators and the second sensor selectively to the second meter so that in different positions of the second switching means, the second meter indicates
  1. actual exhaust gas temperature as measured by the second sensor,
  2. the exhaust gas temperature upper limit for any given engine speed
  3. the exhaust gas temperature lower limit for the same engine speed condition, and
  4. an operator is thereby able to quickly verify that his actual exhaust gas temperature is within the upper and lower limits by manipulating the second switching means between its various positions and observing the direction of movement of the second meter pointer.

* * * * *